(12) United States Patent
Bowen

(10) Patent No.: US 7,711,387 B2
(45) Date of Patent: May 4, 2010

(54) MOBILE DEVICE POWER CONTROL FOR DUAL TRANSFER MODE (DTM)

(75) Inventor: Toby John Bowen, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 667 days.

(21) Appl. No.: 11/421,282

(22) Filed: May 31, 2006

(65) Prior Publication Data

US 2007/0281727 A1 Dec. 6, 2007

(51) Int. Cl.
*H04B 7/00* (2006.01)
*H04B 1/00* (2006.01)
*H04M 3/00* (2006.01)
*H04W 4/00* (2009.01)
*H04M 1/00* (2006.01)
*H04B 7/204* (2006.01)
*H04L 12/66* (2006.01)

(52) U.S. Cl. .......................... 455/522; 455/69; 455/418; 455/426.1; 455/552.1; 370/319; 370/331; 370/352

(58) Field of Classification Search ................ 455/13.4, 455/69, 70, 86, 115.1, 125, 126, 127.1, 127.2, 455/130, 138, 134, 136, 137, 180.3, 404.1, 455/404.2, 405, 418, 419, 420, 426.1, 456.1, 455/456.2, 515, 522, 523, 524, 552.1, 570; 370/319, 321, 328, 331, 334, 336, 337, 338, 370/342, 345, 347, 352, 354, 359, 314, 458; 342/174, 357.06, 387, 442, 457, 46
See application file for complete search history.

(56) References Cited

U.S. PATENT DOCUMENTS 6,631,259 B2 * 10/2003 Pecen et al. .............. 455/426.1

(Continued)

FOREIGN PATENT DOCUMENTS

EP 1237286 9/2002

(Continued)

OTHER PUBLICATIONS

International Preliminary Report on Patentability, corresponding to International Patent Application No. PCT/US2006/060247, dated Dec. 18, 2008.

(Continued)

*Primary Examiner*—Nay A Maung
*Assistant Examiner*—Paul P Tran
(74) *Attorney, Agent, or Firm*—R. Brian Drozd; Moore & Van Allen, PLLC

(57) ABSTRACT

A system and method of re-distributing power output by a portable mobile communications device while operating in dual transfer mode (DTM) is disclosed. The device determines if more than one uplink slot is active and if DTM is active. If so, power can be separately regulated for packet switched and carrier switched uplink slots. The device determines whether the circuit switched slot is being used for a voice call that is not in a handsfree or speakerphone mode and evaluates factors associated with the current operating conditions. New power settings are calculated based on the mode for the active circuit switched slot and the factors associated with the current operating conditions of the device. The new power settings are then applied to the active uplink slots such that power is re-distributed on a per slot basis that is not necessarily divided equally among all active slots.

7 Claims, 5 Drawing Sheets

U.S. PATENT DOCUMENTS

2005/0207396 A1* 9/2005 Vaittinen et al. ............ 370/352
2005/0255872 A1* 11/2005 Lundell et al. .............. 455/522
2005/0276244 A1* 12/2005 Gronberg et al. ............ 370/328
2006/0209803 A1* 9/2006 Rajaniemi et al. ........... 370/352
2007/0014265 A1* 1/2007 Casaccia ..................... 370/337

FOREIGN PATENT DOCUMENTS

WO         2005/032010         4/2005

OTHER PUBLICATIONS

Decreusefond L. et al., "Admission Control Strategies for Dual Transfer Mode Service in EGPRS Networks", Vehicular Technology Conference, Sep. 2004.
Digital cellular telecommunications system (Phase 2+), ETSI Standards, ETSI TS 143 055 v6.11.0, Sep. 2005.
Sony Ericsson Mobile Communications AB, International Application Ser. No. PCT/US2006/060247, International Search Report, Apr. 20, 2007.
Sony Ericsson Mobile Communications AB, International Application Ser. No. PCT/US2006/060247, Written Opinion, Apr. 20, 2007.

* cited by examiner

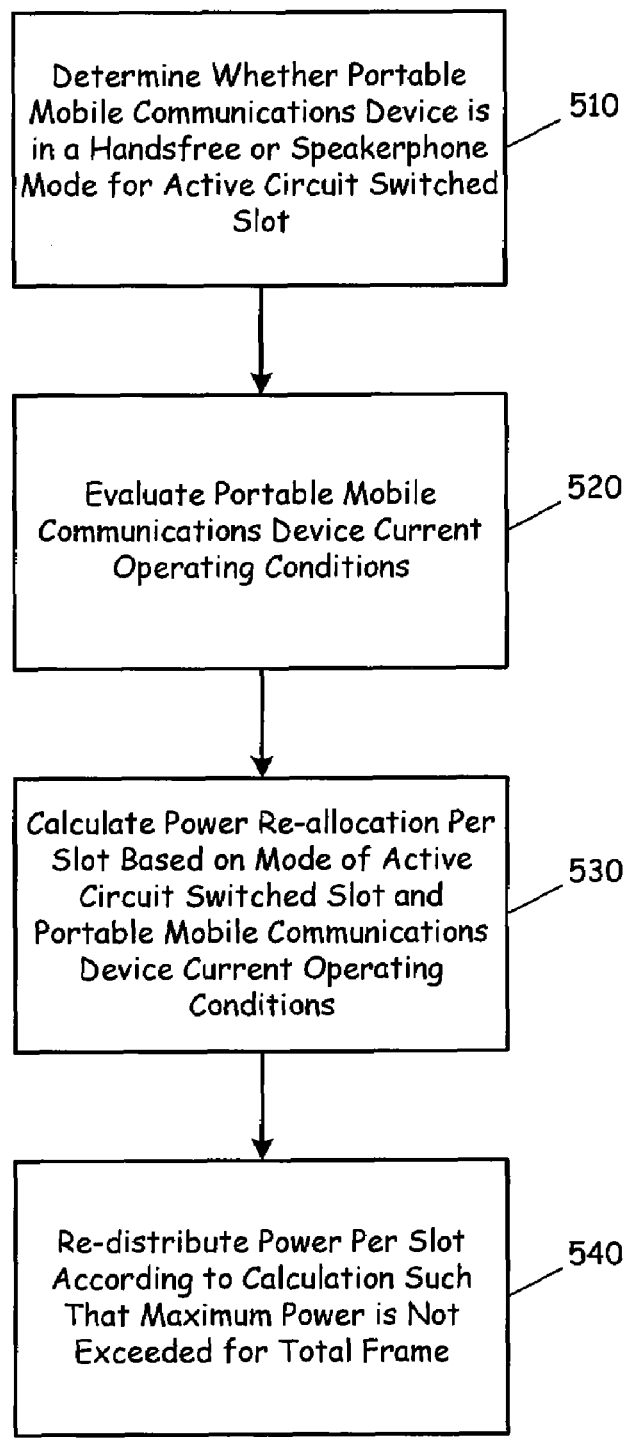

ately regulate the power used for transmission while in Dual Transfer Mode (DTM) based on the portable mobile communications device's current state(s).

MOBILE DEVICE POWER CONTROL FOR DUAL TRANSFER MODE (DTM)

BACKGROUND OF THE INVENTION

The present invention relates to portable mobile communications devices and systems, and more particularly to a portable mobile communications device, system and method that can dynamically regulate the power used for transmission while in Dual Transfer Mode (DTM) based on the portable mobile communications device's current state(s).

DTM permits execution of both circuit switched (CS) and packet switched (PS) applications when more than one slot is available to the portable mobile communications device. However, the total output power available to the portable mobile communications device is fixed meaning that the multiple uplink slots are forced to share the total output power. Typically, the output power will be divided equally among the active slots and the applications utilizing those slots are forced to operate with the power allocated. This may not always be the most efficient distribution of total output power based on the portable mobile communications device applications associated with the active uplink slots.

For instance, a CS application (e.g., a voice call) may prefer more power than an equal distribution would provide for quality of services (QoS) purposes. Many packet switched (PS) applications are not as quality or time dependent and can afford to use less power than what they would likely be allocated under an equal distribution scenario.

Currently, there is no portable mobile communications device controlled system or method of controlling the distribution of total output power among several active uplink slots in DTM.

BRIEF SUMMARY OF THE INVENTION

In accordance with an embodiment of the present invention, there is described a system and method of re-distributing power output by a portable mobile communications device while operating in dual transfer mode (DTM) is disclosed. The portable mobile communications device determines if more than one uplink slot is active and if DTM is active. If so, power can be separately regulated for packet switched and carrier switched uplink slots. The portable mobile communications device determines whether the circuit switched slot is being used for a voice call that is not in a handsfree or speakerphone mode and evaluates factors associated with the current operating conditions. New power settings are calculated based on the mode for the active circuit switched slot and the factors associated with the current operating conditions of the portable mobile communications device. The new power settings are then applied to the active uplink slots such that power is re-distributed on a per slot basis that is not necessarily divided equally among all active slots.

BRIEF DESCRIPTION OF THE DRAWINGS

FIG. 5 is a flowchart describing more detailed data flow for the power reduction application operating within a portable mobile communications device according to another embodiment of the present invention.

DETAILED DESCRIPTION OF THE INVENTION

Dual Transfer Mode (DTM) combines the two basic technologies used to build high capacity networks—circuit and packet switching. The idea behind DTM is to provide high speed networking with high quality transmissions along with the ability to adapt the bandwidth to traffic variations quickly. DTM is designed to be used in integrated service networks for both distribution and one-to-one communication. DTM can be used directly for application-to-application communication or as a carrier for higher layer protocols such as Internet Protocol (IP).

The Global System for Mobile Communication (GSM) specification (45.005 §4.1.1) allows for a reduction in output power when multiple uplink slots are active in DTM. This power reduction may not be necessary in packet switched mode with just two active uplink slots. However, in DTM, where the circuit switched slot is being used to transmit voice it can be useful to reduce individual slot output power when more than one packet switched uplink slots are also active. By controlling the power output for the various slots, the portable mobile communications device can apply more power to applications using slots that could benefit from a power boost and can reduce the power to applications in slots where it would likely not be as noticeable to the user. Power can thus be maximized for some slots and reduced for others based on a variety of factors leading to a more efficient distribution of power while the portable mobile communications device is in DTM with multiple active uplink slots.

The present invention provides for dynamic power settings for a portable mobile communications device while in DTM. When more than one uplink slot is active in a frame, power reduction should be employed according to GSM specification 45.005 §4.1.1. In addition to the GSM specification requirements the present invention considers additional parameter(s) or conditions with respect to the power control application if DTM is active. In one embodiment, the additional parameter(s) permit different maximum power levels to be set for DTM operation and packet switched data only operation. A more advanced solution permits independent control of the packet switched and circuit switched slot power in order to prioritize the link quality depending on the application and/or radio conditions.

Figure 1:
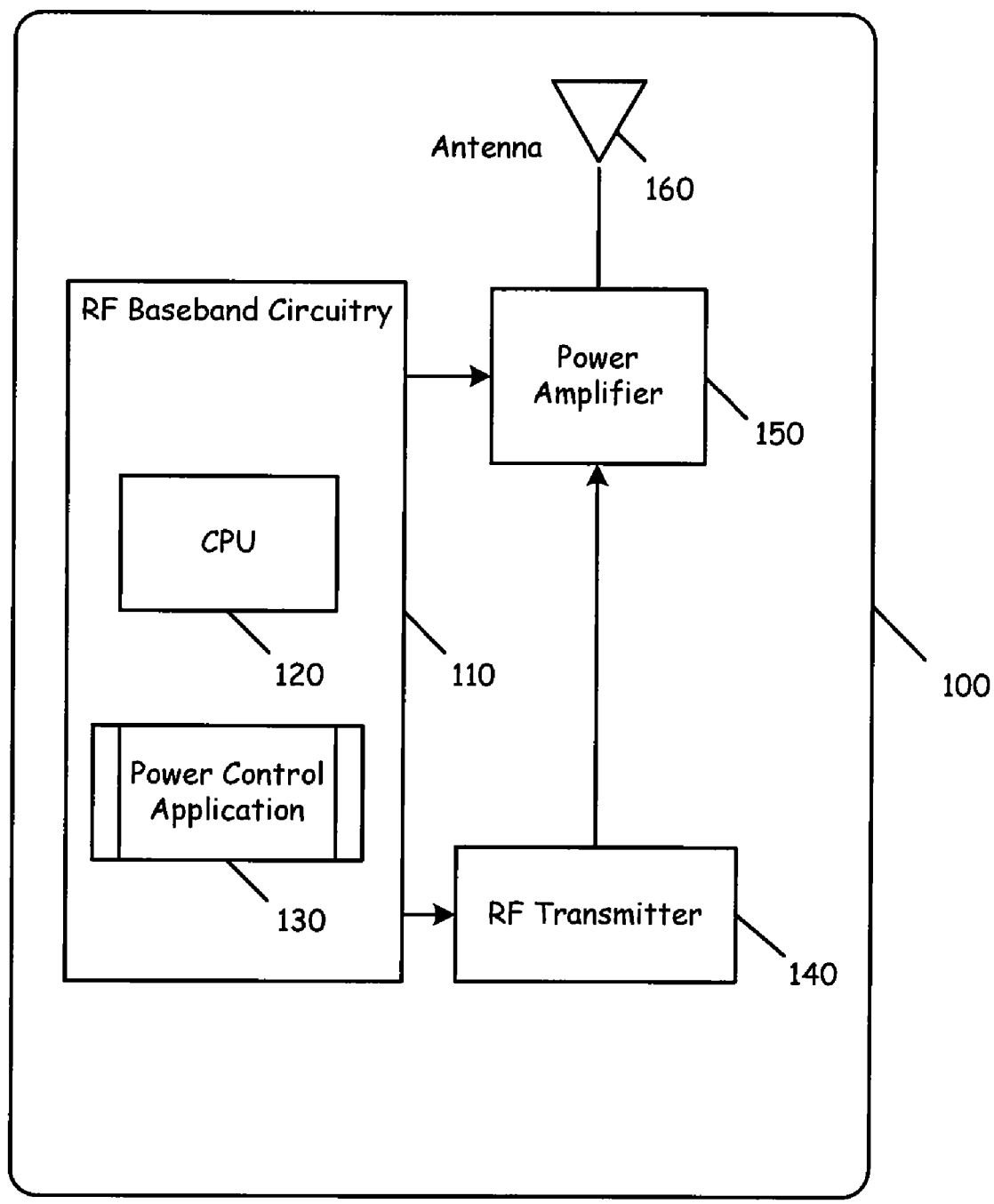
FIG. 1 is a block diagram of certain components in an exemplary portable mobile communications device implementing the present invention.

FIG. 1 is a block diagram of an exemplary portable mobile communications device implementing the present invention. A portable mobile communications device 100 includes RF baseband circuitry 110. The RF baseband circuitry 110 encompasses, among other elements, a processor (CPU) 120 and a power control application 130. The RF baseband circuitry 110 is coupled with an RF transmitter 140 and a power amplifier 150 which is coupled with an antenna 160.

The power output at the antenna 160 is set by the power control application 130 executed by the CPU 120. This power control application 130 controls the output of the RF transmitter 140 and the gain of the power amplifier 150, by means of the RF baseband circuitry 110, on a slot-by-slot basis.

Figure 2:
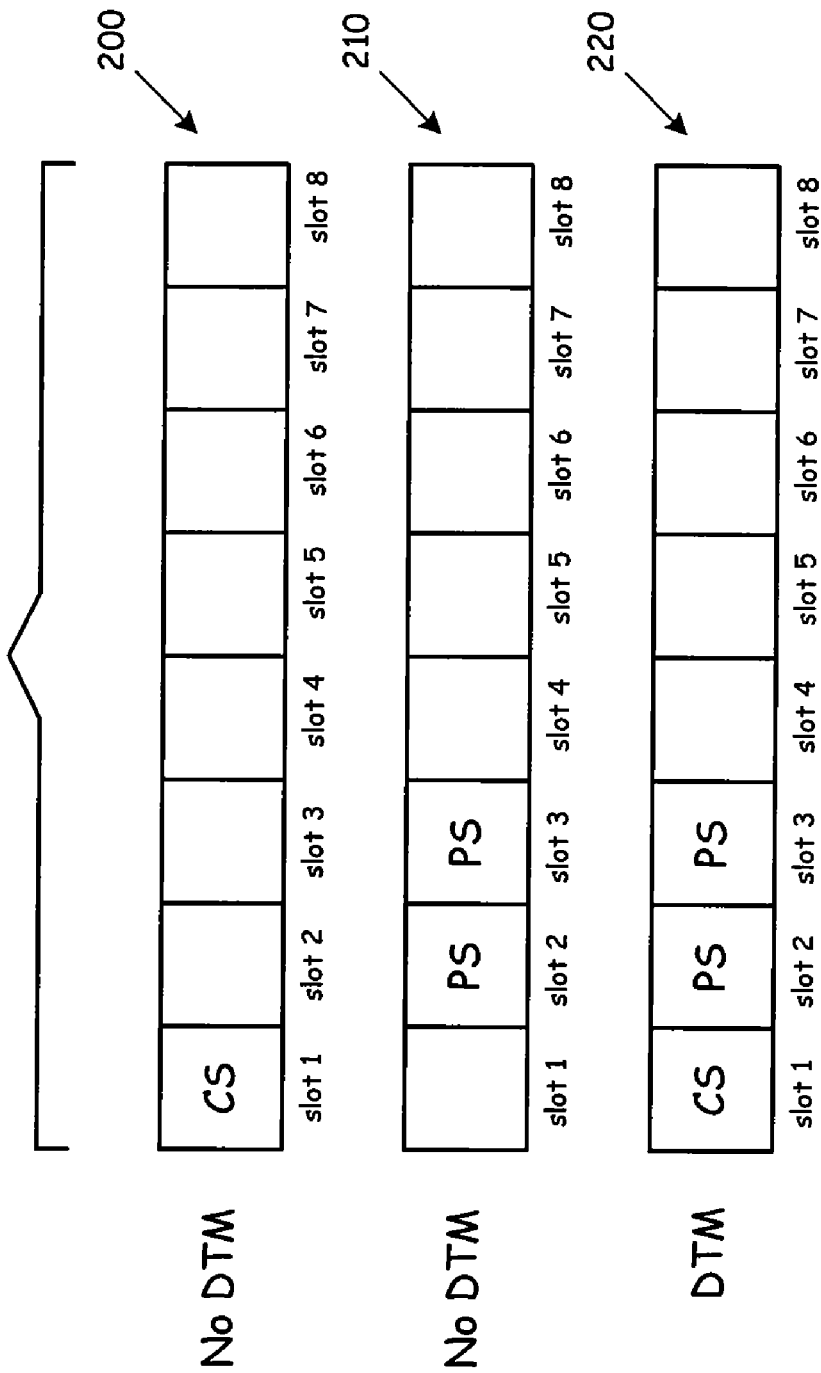
FIG. 2 illustrates examples of DTM and non-DTM data frames from the perspective of the network infrastructure.

FIG. 2 illustrates examples of non-DTM data frames 200, 210 and a DTM data frame 220 from a network perspective.

On a typical non-DTM data frame for a voice call 200, a circuit switched connection is established using one timeslot per portable mobile communications device. For non-DTM data sessions, one or more packet switched slots may be assigned per frame 210 to a portable mobile communications device. In DTM, circuit switched and packet switched slots can be allocated on the same frame 220 for a given portable mobile communications device.

Figure 3:
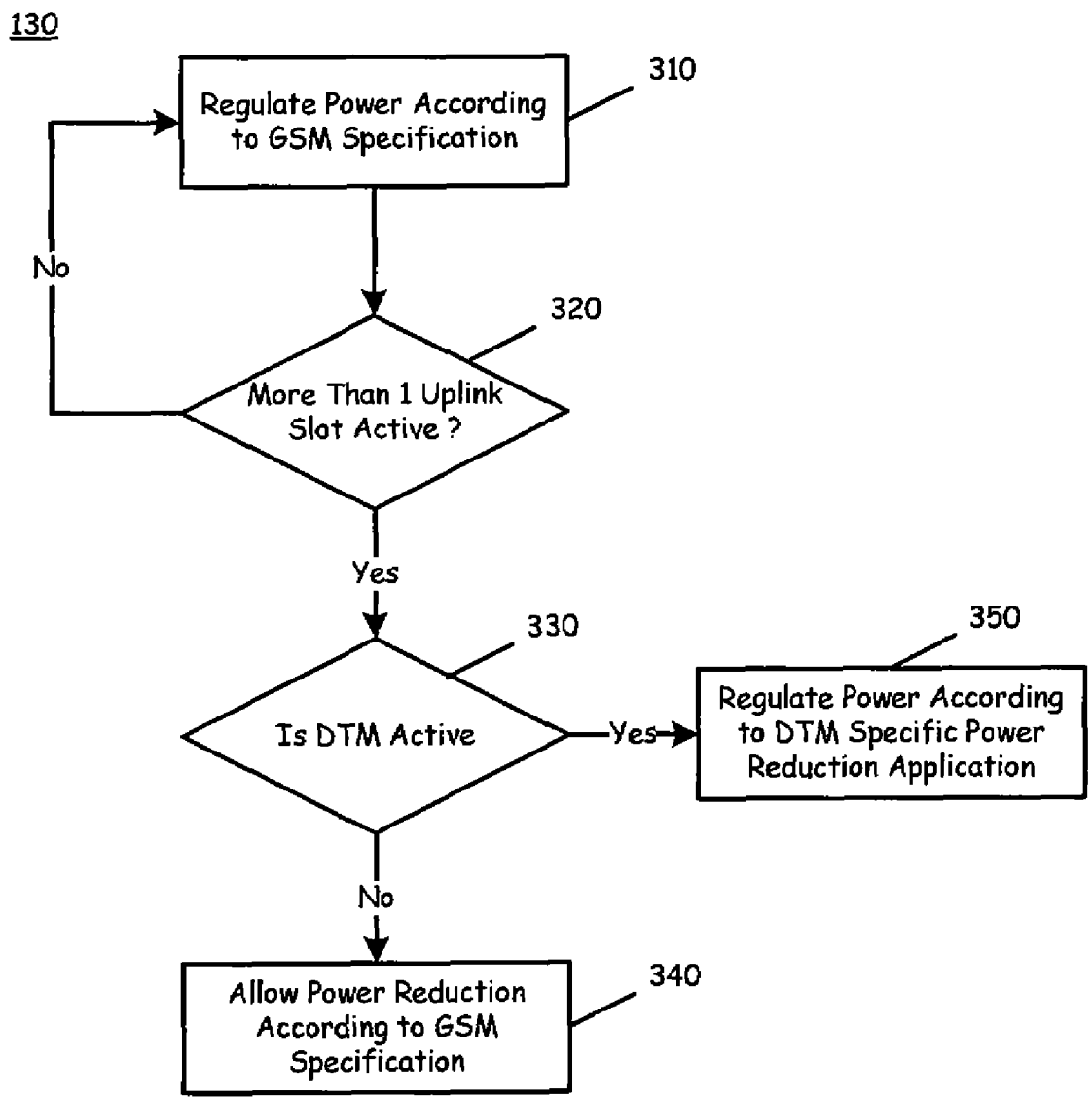
FIG. 3 is a flowchart describing high level data flow operating within a portable mobile communications device according to the present invention.

FIG. 3 is a flowchart describing high level data flow for the power control application 130 according to the present invention. The novelty of the present invention involves efficiently allocating power using a power reduction application when in DTM and more than one uplink slot is active. If more than one uplink slot is active, power reduction is allowed under the GSM specification according to section 4.1.1 of paragraph 45.005. For each transmitted (uplink) frame power is regulated 310 on a slot by slot basis according to the GSM specification according to paragraph 45.005.

As per the GSM specification, in order to manage portable mobile communications device heat dissipation resulting from transmission on multiple uplink timeslots, the mobile station may reduce its maximum output power by up to the following values:

| Number of Timeslots in Uplink Assignment | Permissible Nominal Reduction of Maximum Output Power (dB) |
|---|---|
| 1 | 0 |
| 2 | 3.0 |
| 3 | 4.8 |
| 4 | 6.0 |
| 5 | 7.0 |
| 6 | 7.8 |
| 7 | 8.5 |
| 8 | 9.0 |

The actual supported maximum output power for the portable mobile communications device (designated 'MS' in the equations below) shall be in the range indicated by the parameters XXX_MULTISLOT_POWER_PROFILE (See 3GPP TS 24.008) for 'n' allocated uplink timeslots:

$$a = MS \text{ maximum output power} = \min(MAX\_PWR, a+b)$$

where $$a = \min(MAX\_PWR, MAX\_PWR + XXX\_MULTISLOT\_POWER\_PROFILE - 10 \log(n));$$

MAX_PWR=MS maximum output power according to the relevant power class;

XXX_MULTISLOT_POWER_PROFILE refers to either GMSK_MULTISLOT_POWER_PROFILE or 8-PSK_MULTISLOT_POWER_PROFILE depending on the modulation type involved, and XXX_MULTISLOT_POWER_PROFILE 0=0 dB
XXX_MULTISLOT_POWER_PROFILE 1=2 dB
XXX_MULTISLOT_POWER_PROFILE 2=4 dB
XXX_MULTISLOT_POWER_PROFILE 3=6 dB For DCS 1800 and PCS 1900 frequency bands b=3 dB, for all other bands b=2 dB.

The supported maximum output power for each number of uplink timeslots shall form a monotonic sequence. The maximum reduction of maximum output power from an allocation of n uplink timeslots to an allocation of n+1 uplink timeslots shall be equal to the difference of maximum permissible nominal reduction of maximum output power for the corresponding number of timeslots as defined in the table above.

As an exception, in case of a multislot uplink assignment, the first power control step down from the maximum output power is allowed to be in the range between 0 and 2 dB. In case the MS transmits on more uplink slots than assigned (e.g., due to a polling response, see 3GPP TS 44.060), the MS may reduce uplink power as above for a multislot uplink configuration but as a function of the number of active uplink slots on a TDMA frame basis.

On a multislot uplink configuration the MS may restrict the interslot output power control range to a 10 dB window, on a TDMA frame basis. On those timeslots where the ordered power level is more than 10 dB lower than the applied power level of the highest power timeslot, the MS shall transmit at a lowest possible power level within 10 dB range from the highest applied power level, if not transmitting at the actual ordered power level.

Referring again to FIG. 3, a determination is made whether more than one uplink slot is currently active 320. If not power continues to be regulated according to the GSM specification 310. If more than one uplink slot is currently active 320 then a further determination is made to determine if in DTM 330. If not in DTM, power reduction can occur 340 according to the GSM specification in section 4.1.1 of paragraph 45.005 as described above. If in DTM, however, power can be regulated 350 according to the DTM specific aspect of the power reduction application described in FIG. 4 below.

Figure 4:
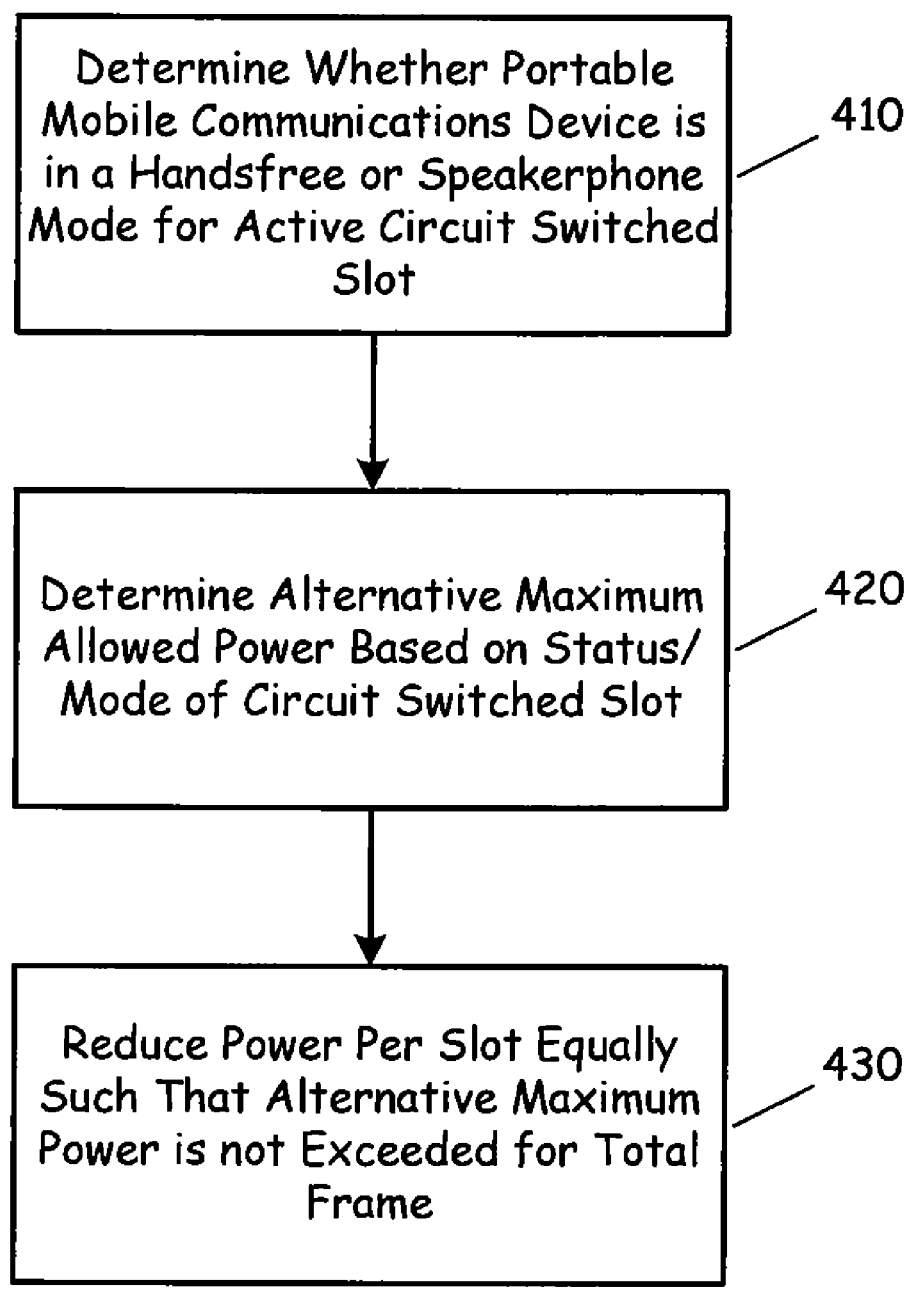
FIG. 4 is a flowchart describing more detailed data flow for the power reduction application operating within a portable mobile communications device according to the present invention.

FIG. 4 is a flowchart describing more detailed data flow of the power reduction application within a portable mobile communications device according to the present invention. In the simplest implementation, an alternative maximum allowed power level as provided in the GSM specification is used only for DTM. This alternative maximum allowed power level is averaged across all slots in the frame and takes into account the power dissipation in the handset when being used for a DTM voice call. The power reduction is still within the limits set by the GSM specification in section 4.1.1 of paragraph 45.005 but the actual reduction per slot is set such that the total power per frame does not exceed the alternative maximum allowed power level.

The difference in the maximum allowable power levels depends on whether the portable mobile communications device is operating in a fashion that requires the user to hold the portable mobile communications device next to his ear. This impliedly occurs during a voice call that does not involve a handsfree mode or speakerphone mode. This also implies that there is an active circuit switched slot. When on a voice call that is not in handsfree mode or speakerphone mode, the maximum allowable power according to the GSM specification is lower than the maximum allowable power in situations not associated with the portable mobile communications device being next to the user's ear.

The first step is to determine whether the portable mobile communications device is in a handsfree or speakerphone mode for the active circuit switched slot 410. Depending on the status or mode of the circuit switched slot, an alternative maximum power level is obtained from the GSM specification 420. The power per slot is then equally reduced for all active slots using the alternative maximum power level.

FIG. 5 is a flowchart describing more detailed data flow for the power reduction application operating within a portable mobile communications device according to another embodiment of the present invention in which the power reduction per uplink slot can be biased according to slot type.

The first step is again to determine whether the portable mobile communications device is in a handsfree or speakerphone mode for the active circuit switched slot 510. The next step is to evaluate factors associated with the current operating conditions of the portable mobile communications device 520. Some of these factors include, but are not limited to, application QoS requirements, battery voltage remaining, current signal quality, heat dissipation, and application priority (timing considerations vs. accuracy considerations). New power settings are then calculated 530 based on the mode for the active circuit switched slot and factors associated with the current operating conditions of the portable mobile communications device. Once calculated, the new power settings are applied such that power is re-distributed on a per slot basis 540 that is not necessarily divided equally among all active slots. DTM power re-distribution will provide a more efficient use of allocated power and can reduce total output power if warranted.

Thus, the power reduction per uplink slot can be biased according to slot type (circuit or packet switched). For instance, if the circuit switched slot is being used for voice it may be determined that its power should not be reduced as much as packet switched data slots in order to maintain QoS requirements. In this case power reduction is only made on the packet switched slot(s). However, if the link quality is good enough to have margin on the voice signal the circuit switched slot power may be reduced to maintain power on the packet switched slot and achieve greater data throughput.

There may also be the possibility to allocate power proportionally between packet switched slots depending on the type of data and priority associated with it according to the application.

Furthermore, the total power level may be scaled according to other current conditions of the portable mobile communications device. Ambient temperature or battery voltage for power amplifier heat dissipation can be considerations. Whether the audio is being routed through a handsfree device or in speaker phone mode can also affect the total power level requirements of the portable mobile communications device since the portable mobile communications device will likely not be in contact with the user's ear in these modes. The table below illustrates some of the factors and considerations described above that could affect a power setting for active uplink slots in DTM.

dissipation) Furthermore, it may be determined because of current signal conditions that the CS slot needs the greatest uplink power to maintain the voice call and the throughput on the PS session may be sacrificed by reducing the power in these slot(s). As the call continues the signal strength may improve and then the CS slot power may be reduced allowing the PS slot power to increase again.

In another example, a user could be on a voice call and then decide to send a picture to the other party. In this case it may be appropriate to bias the power towards the PS slots as the other party will be waiting for the picture and the transfer rate will be apparent to both parties. This priority could be coupled to a voice activity detector which would indicate when the user was not speaking and therefore less emphasis is required on the voice quality over the CS uplink slots.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which

TABLE I

| Portable Mobile Communications Device Active Applications | Portable Mobile Communications Device Current Status and Condition Factors | Number/Type of DTM Slots Currently Active | Power Bias of Currently Active DTM Slots |
| --- | --- | --- | --- |
| Voice Call | Poor Signal Quality, Low Priority Data Application | CS | Increase CS Slot Power |
| E-mail Sync | | PS | Reduce PS Slot Power |
| Voice Call | Signal Quality good for Voice Call, Data Priority High for Time Purposes | CS | Reduce CS Slot Power |
| Sending Digital Picture | | PS | Increase PS Slot Power |
| Browsing Web | Interactive QoS on PS with generally low UL traffic but need fast response to navigation commands | CS | Reduce CS Slot Power |
| Voice Call | | PS | Increase PS Slot Power |
| Internet Messaging | Internet messaging is usually short messages with low priority on speed | CS | Increase CS Slot Power |
| Voice call | | PS | Reduce PS Slot Power |
| Voice Call | Poor Signal Quality,, Low Priority E-mail Data Application, High Priority for Sending Digital Picture (Time) | CS | Increase CS Slot Power |
| E-mail Sync | | PS (E-mail) | Reduce PS Slot Power |
| Sending Digital Picture | | PS (Send Picture) | Increase PS Slot Power |

Consider an example where a packet data session has been established (e.g. synch e-mail) and then a phone call comes in which establishes a DTM call with voice on the CS slot. This could cause a situation where the total TX power has to be reduced to stay within a pre determined criteria (e.g. power the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of reducing power output by a portable mobile communications device while operating in dual transfer mode (DTM) comprising:
   determining if more than one uplink slot is active;
   determining if DTM is active;
   such that if DTM is active and more than one uplink slot is active output power can be regulated for uplink slots by:
   determining an alternative maximum power setting based on determining whether a circuit switched slot is being used for a voice call that is not in a handsfree or speakerphone mode for evaluating factors associated with current operating conditions of the portable mobile communications device; and
   reducing the power per slot equally among all active slots such that the alternative maximum power determined is not exceeded.

2. A method of re-distributing power output by a portable mobile communications device while operating in dual transfer mode (DTM) comprising:
   determining if more than one uplink slot is active;
   determining if DTM is active;
   such that if DTM is active and more than one uplink slot is active output power can be regulated separately for packet switched and circuit switched uplink slots by:
   determining whether a circuit switched slot is being used for a voice call that is not in a handsfree or speakerphone mode for evaluating factors associated with current operating conditions of the portable mobile communications device;
   calculating new power settings based on the determining that active circuit switched slot is being used for a voice call that is not being in a handsfree or speakerphone mode and the factors associated with the current operating conditions of the portable mobile communications device; and
   applying the new power settings to the active uplink slots such that power is re-distributed on a per slot basis that is not necessarily divided equally among all active slots.

3. The method of claim 2 wherein the factors associated with the current operating conditions of the portable mobile communications device include application QoS requirements, remaining battery voltage, current signal quality, heat dissipation, application timing considerations, or application accuracy considerations.

4. A system of re-distributing power output by a portable mobile communications device while operating in dual transfer mode (DTM) comprising:
- means for determining if more than one uplink slot is active;
- means for determining if DTM is active;
- such that if DTM is active and more than one uplink slot is active output power can be regulated separately for packet switched and carrier switched uplink slots by:
- means for determining whether a circuit switched slot is being used for a voice call that is not in a handsfree or speakerphone mode for evaluating factors associated with current operating conditions of the portable mobile communications device;
- means for calculating new power settings based on the determining that the active circuit switched slot is being used for a voice call that is not being in a handsfree or speakerphone mode and the factors associated with the current operating conditions of the portable mobile communications device; and
- means for applying the new power settings to the active uplink slots such that power is re-distributed on a per slot basis that is not necessarily divided equally among all active slots.

5. The system of claim 4 wherein the factors associated with the current operating conditions of the portable mobile communications device include application QoS requirements, remaining battery voltage, current signal quality, heat dissipation, application timing considerations, or application accuracy considerations.

6. A computer readable storage medium with a computer program product comprising instructions contained therein for re-distributing power output by a portable mobile communications device while operating in dual transfer mode (DTM), the instructions when executed causing a portable mobile communications device to perform:
- determining if more than one uplink slot is active;
- determining if DTM is active;
- regulating output power separately for packet switched and circuit switched uplink slots when DTM is active and more than one uplink slot is active by:
- determining whether a circuit switched slot is being used for a voice call that is not in a handsfree or speakerphone mode for evaluating factors associated with current operating conditions of the portable mobile communications device;
- calculating new power settings based on the determining that the active circuit switched slot is being used for a voice call that is not being in a handsfree or speakerphone mode and the factors associated with the current operating conditions of the portable mobile communications device; and
- applying the new power settings to the active uplink slots such that power is re-distributed on a per slot basis that is not necessarily divided equally among all active slots.

7. The storage medium of claim 6 wherein the factors associated with the current operating conditions of the portable mobile communications device include application QoS requirements, remaining battery voltage, current signal quality, heat dissipation, application timing considerations, or application accuracy considerations.

* * * * *

UNITED STATES PATENT AND TRADEMARK OFFICE
CERTIFICATE OF CORRECTION

PATENT NO.        : 7,711,387 B2                                                    Page 1 of 1
APPLICATION NO.   : 11/421282
DATED             : May 4, 2010
INVENTOR(S)       : Toby John Bowen It is certified that error appears in the above-identified patent and that said Letters Patent is hereby corrected as shown below:

Column 8, Line 57: after "that" insert --the--.

Signed and Sealed this

Twenty-second Day of June, 2010

David J. Kappos
*Director of the United States Patent and Trademark Office*